(12) United States Patent
Holkema

(10) Patent No.: US 10,891,820 B2
(45) Date of Patent: Jan. 12, 2021

(54) COUNTERFEIT NOTE TRACKING

(71) Applicant: NCR Corporation, Atlanta, GA (US)

(72) Inventor: René Holkema, Rifferswil (CH)

(73) Assignee: NCR Corporation, Atlanta, GA (US)

(*) Notice: Subject to any disclaimer, the term of this patent is extended or adjusted under 35 U.S.C. 154(b) by 175 days.

(21) Appl. No.: 16/118,024

(22) Filed: Aug. 30, 2018

(65) Prior Publication Data
US 2020/0074781 A1   Mar. 5, 2020

(51) Int. Cl.
*G07D 11/30* (2019.01)
*G06K 19/07* (2006.01)
*G06K 9/62* (2006.01)
*G07D 7/00* (2016.01)
*G07D 7/1205* (2016.01)
*G07D 7/164* (2016.01)
*G07D 7/04* (2016.01)

(52) U.S. Cl.
CPC ............ *G07D 11/30* (2019.01); *G06K 9/6262* (2013.01); *G06K 19/0723* (2013.01); *G07D 7/00* (2013.01); *G07D 7/04* (2013.01); *G07D 7/1205* (2017.05); *G07D 7/164* (2013.01); *G07D 2207/00* (2013.01)

(58) Field of Classification Search
CPC ............ G06K 19/0723; G06K 9/6262; G07D 2207/00; G07D 7/00; G07D 7/164; G07D 11/0066; G07D 11/30; G07D 7/04; G07D 7/1205
See application file for complete search history.

(56) References Cited

U.S. PATENT DOCUMENTS

| | | | | |
|---|---|---|---|---|
| 2005/0141759 A1* | 6/2005 | Mori | ....................... | G07D 7/187 382/135 |
| 2011/0082969 A1* | 4/2011 | Macor | .................... | G06Q 30/06 711/103 |
| 2014/0369590 A1* | 12/2014 | He | ........................... | G07D 7/04 382/135 |
| 2017/0344823 A1* | 11/2017 | Withrow | ................. | G06F 21/30 |

\* cited by examiner

*Primary Examiner* — Said M Elnoubi
(74) *Attorney, Agent, or Firm* — Schwegman, Lundberg & Woessner

(57) ABSTRACT

Disclosed are systems and methods for modifying a counterfeit template and tracking a counterfeit note. The systems and methods may include receiving properties of a plurality of counterfeit notes and modifying a counterfeit template using the properties of the plurality of counterfeit notes. The systems and methods also may include receiving a counterfeit note, collecting data from the counterfeit note, and receiving a request for the data collected from the counterfeit note.

13 Claims, 3 Drawing Sheets

COUNTERFEIT NOTE TRACKING

SUMMARY

Disclosed are systems and methods for modifying a counterfeit template and tracking a counterfeit note. The systems and methods may include receiving properties of a plurality of counterfeit notes and modifying a counterfeit template using the properties of the plurality of counterfeit notes. The systems and methods also may include receiving a counterfeit note, collecting data from the counterfeit note, and receiving a request for the data collected from the counterfeit note.

BRIEF DESCRIPTION OF THE FIGURES

The above-mentioned and other features and benefits of the present disclosure, and the manner of attaining them, will become more apparent, and the disclosure itself will be better understood, by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the disclosure any manner.

DETAILED DESCRIPTION

Figure 1:
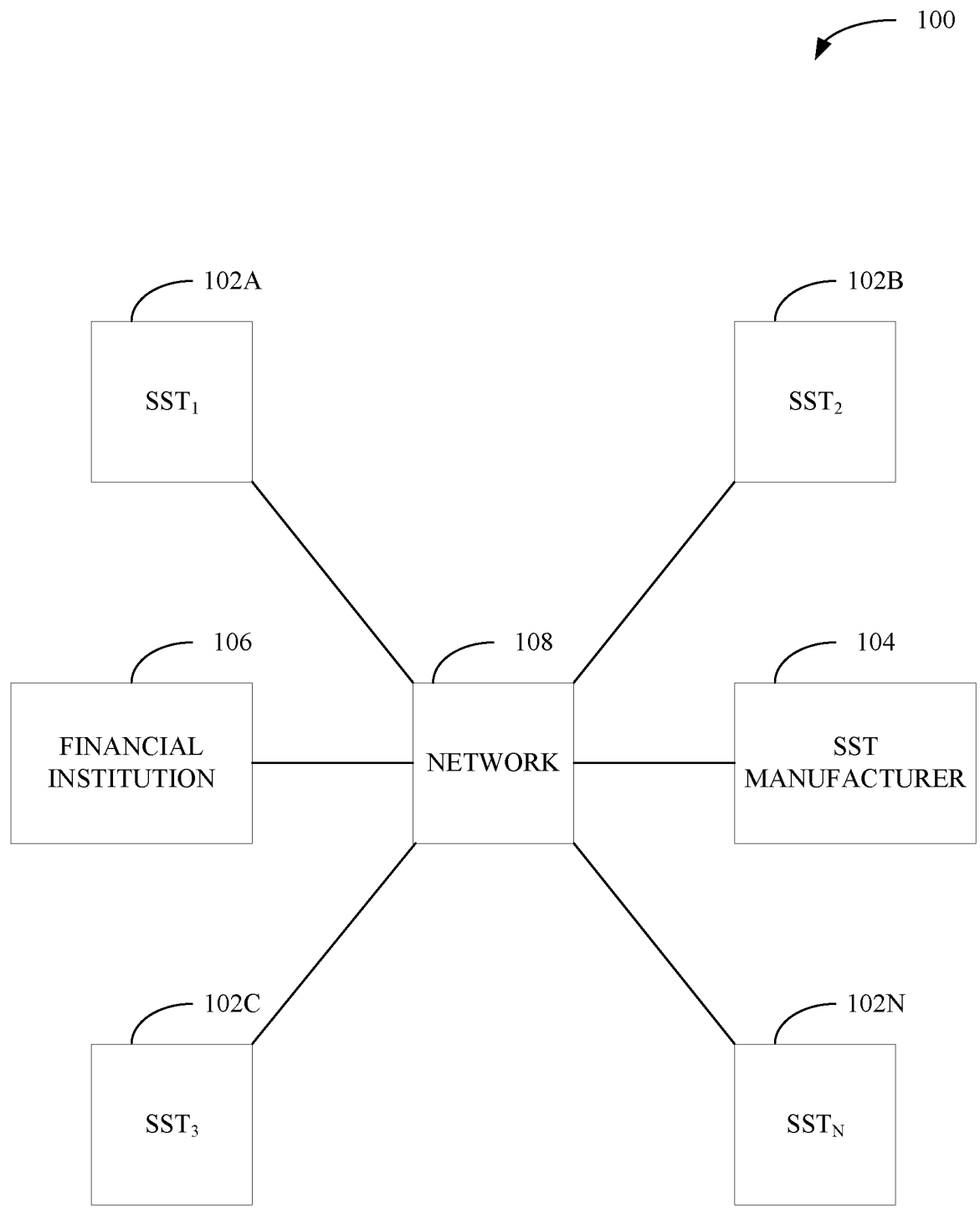
FIG. 1 shows an example schematic of a system for counterfeit note tracking consistent with this disclosure.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any of the embodiments disclosed herein is defined by the appended claims.

Currency templates need to recognize counterfeit notes. Incorrect recognition could result in having to change the deposit/recycling equipment of a self-service terminal such as an automated teller machine (ATM) or a self-checkout terminal. To develop and maintain a counterfeit template, access to counterfeits may be required. The counterfeit template may include data collected from counterfeit notes. The data may include variations in properties of the counterfeit notes from properties of a genuine note. For example, a counterfeiting organization may produce counterfeit notes that have similar properties because the counterfeit notes may all be produced using the same systems and methods. As a result, any variations in the properties of the counterfeit notes from genuine notes may be consistent throughout the counterfeit notes. Thus, data associated with the variations in the properties of the counterfeit notes may be used to identify other counterfeit notes.

Generally, when a counterfeit is recognized as a good note, there is no access to the counterfeit anymore because the financial institution that recognized the note as a counterfeit turns the note over to authorities as evidence, and the authorities will not allow self-service manufacturers access to the counterfeit note. As a result, self-service manufacturers are not able to collect data from the counterfeit note to incorporate into counterfeit templates. As used herein, self-service manufacturer may include self-service terminal providers, operators, maintenance providers, etc. and is not limited to the builder of self-service terminals.

The systems and methods disclosed herein may allow for data to be collected on the counterfeit note before it is recognized as a counterfeit. Once the note is recognized as a counterfeit, the data can be retrieved. The retrieved data can then be used to modify the counterfeit templates.

As disclosed herein, when notes are received at a self-service terminal, data can be collected for all of the notes. The data that is collected can be saved to a secure digital (SD) card. The SD card can be connected to the self-service terminal. For example, the self-service terminal may include a bill validator and the SD card may be operatively coupled to the bill validator so that, as the bill validator validates the note, the properties measured by the bill validator may be saved to the SD card.

For example, the bill validator may include an optical scanner that reads the serial number of the note. The serial number of the note should be unique since if the self-service terminal receives two notes with the same serial number there is a high probability at least one of the notes is a counterfeit note. As a result, the serial number, or other unique identifier of the note, can be used to identify and index data collected with each note received by the self-service terminal. When a counterfeit note is later identified by a financial institution, the financial institution may provide the serial number for the counterfeit note. Using the serial number of the counterfeit note, either the financial institution or the manufacturer of the self-service terminal may retrieve the data associated with the counterfeit note from the SD card of the self-service terminal. As used herein, a serial number may not be an actual serial number but instead may be a counterfeit serial number or a number that purports to be a serial number.

The manufacturer may access the SD card of the self-service terminal using a network, such as the Internet. Once the SD card is accessed, the manufacturer may retrieve the data associated with the counterfeit note without having to allow the financial institution access to the data stored on the SD card. In another example, the financial institution may access the data stored on the SD card and transmit the data to the self-service terminal without the manufacturer having to visit the site of the self-service terminal or otherwise access the self-service terminal.

Because the data for each note is collected, if a note is incorrectly identified as a counterfeit note, the data associated with the note also may be used to modify the counterfeit template. For example, the range of values for a property may be too wide such that genuine notes are identified as counterfeit notes. Thus, using the data from the misidentified notes, the counterfeit template may be updated to narrow or contract the range of values for the property.

As used herein, "genuine note" or "genuine notes" means a note or notes produced by a government entity or other entity authorized to produce notes as legal tender. "Counterfeit note" or "counterfeit notes" means notes not produced by a government entity or other entity authorized to produce notes as legal tender.

As discussed herein, counterfeit recognition may also include recognizing categorizes of notes. For example, counterfeit templates along with the systems and methods disclosed herein may be used to recognized various categories of notes in addition to whether or not a note is a counterfeit note. For instance, and as disclosed herein, a bill validator may include various sensors. The sensors may be used to capture information from notes or other media (e.g., paper other than notes) passed into the bill validator.

The counterfeit template may be used to detect or attempt to detect multiple security features (e.g. image, watermark, thickness, etc.) and use the presents or lack of presents of the security features to categorize a note. Example categorization may include:

Category 1—not a note: could be a piece of paper or a folded note or foreign currency.

Category 2—counterfeit: too many security features missing; could be genuine note that is badly damaged note based on the data collected or a real counterfeit.

Category 3—suspected counterfeit: might be a counterfeit such as a very good counterfeit or new counterfeit not seen before by counterfeit template developers.

Category 4A—genuine note in good condition and can be recycled.

Category 4B—genuine note but not in condition to be recycled (e.g., note could contain to too large corner folds, cuts, etc.).

Turning now to the figures, FIG. 1 shows an example schematic of a system 100 for counterfeit note tracking consistent with embodiments disclosed herein. As shown in FIG. 1, system 100 may include a first self-service terminal 102A, a second self-service terminal 102B, a third self-service terminal 102C, and an Nth self-service terminal 102N (collectively, self-service terminals 102); a self-service terminal manufacturer 104; and a financial institution 106. Self-service terminals 102, self-service terminal manufacturer 104, and financial institution 106 may communicate with one another via a network 108. Examples of network 108 include, but are not limited to, the Internet, a wide area network, a local area network, etc.

As disclosed herein, notes may be received at the self-service terminals 102. Data for each of the notes received at self-service terminals 102 may be collected by self-service terminals 102. As detailed herein, the data may be collected via one or more sensors associated with self-service terminals 102. For instance, each of self-service terminals 102 may include a bill validator that may include one or more sensors. As the notes pass through the bill validator, the bill validator may collect data for each note as disclosed herein. As disclosed herein, each of self-service terminals 102 may have a SD card. The SD card may be used to store the collected data.

When a counterfeit note is detected by financial institution 106, financial institution 106 may notify the appropriate authorities and self-service terminal manufacturer 104. Once notified, self-service terminal manufacturer 104 may transmit a request to financial institution 106 or the self-service terminal (e.g., self-service terminal 102A) that received the counterfeit note. Once the request is received, financial institution 106 may retrieve the data collected by the self-service terminal. Financial institution 106 may then transmit the data to self-service terminal manufacture 104. Instead of self-service terminal manufacturer 104 transmitting a request for the data, financial institution 106 may transmit the data with the notification.

In addition, or in alternative, to transmitting a request to financial institution 106 for the data collected by the self-service terminal that received the counterfeit note, self-service terminal manufacturer 104 may transmit a request that includes the serial number recorded for the counterfeit note. The serial number may have been supplied to self-service terminal manufacturer 104 by financial institution 106. The request may be transmitted to the self-service terminal that received the counterfeit note if the identity of that self-service terminal is known. The request may be transmitted to all of self-service terminals 102. Each of self-service terminals 102 may use the serial number included with the request to determine if it received the counterfeit note. Once one of self-service terminals 102 has determined that it received the counterfeit note, the self-service terminal may retrieve the data collected for the counterfeit note from the SD card and transmit the data to the self-service terminal manufacturer 104.

Once self-service terminal manufacturer 104 has received the data collected for the counterfeit note, the counterfeit template may be updated. The updated counterfeit model may then be transmitted to each of self-service terminals 102. Thus, as disclosed herein, self-service terminal manufacturer 104 may be able to update the counterfeit template for each of self-service terminals 102 whenever one of self-service terminals 102 receives a counterfeit note.

Figure 2:
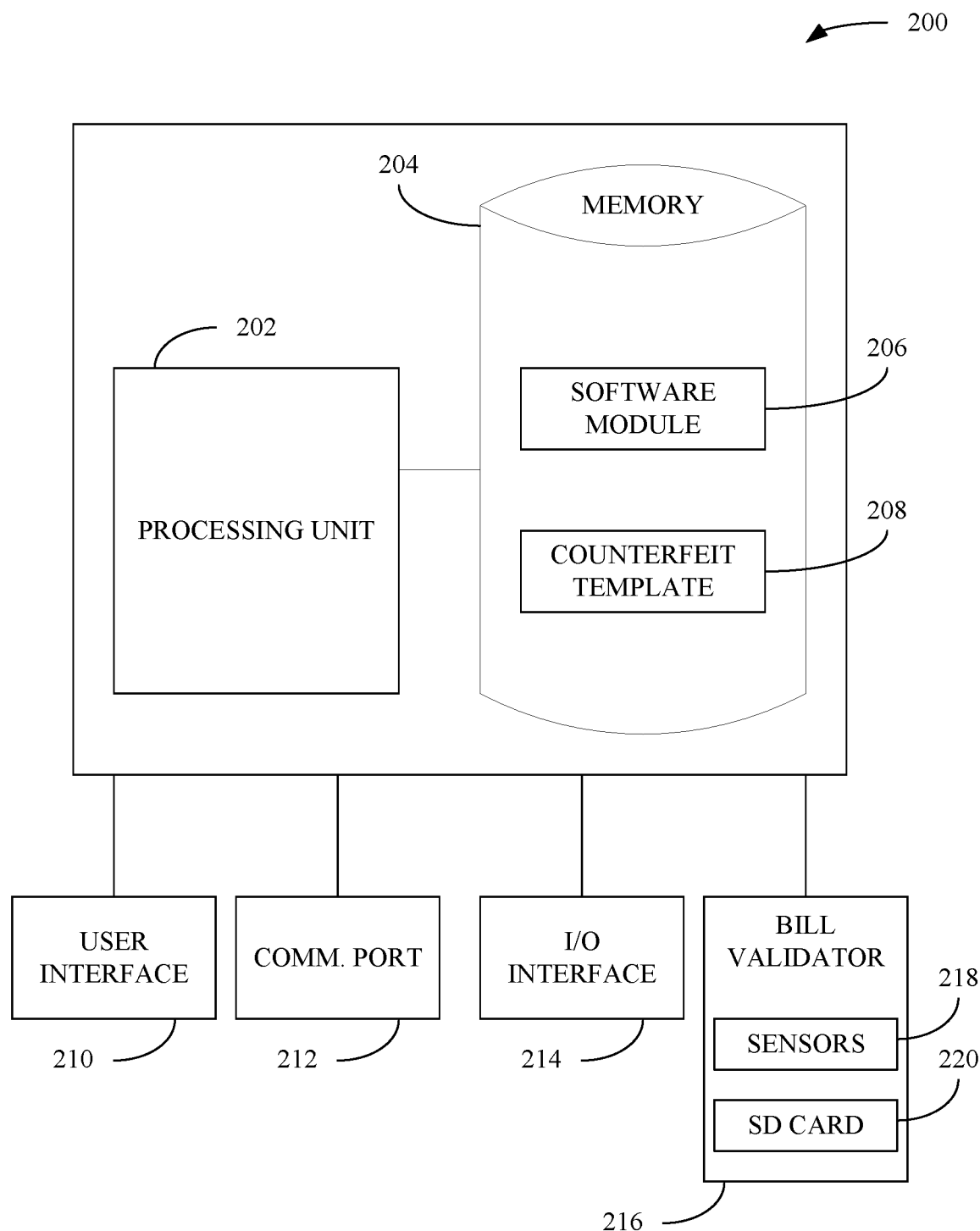
FIG. 2 shows an example schematic of a self-service terminal consistent with this disclosure.

Turning now to FIG. 2, FIG. 2 shows an example schematic of a self-service terminal 200, such as any one of self-service terminals 102. As shown in FIG. 2, self-service terminal 200 may include a processor 202 and a memory 204. Memory 204 may include a software module 206 and a counterfeit template 208. While executing on processor 202, software module 206 may perform processes for modifying counterfeit template 208 and tracking a counterfeit note, including, for example, one or more stages included in a method 300 described below with respect to FIG. 3. Self-service terminal 200 also may include a user interface 210, a communications port 212, an input/output (I/O) interface 214, and a bill validator 216. Bill validator 216 may include a plurality of sensors 218 and a SD card 220.

As disclosed herein, counterfeit template 208 may include data that may be used to identify a counterfeit note. Examples of data that may be used to identify a counterfeit note include, but are not limited to, ranges of values for various parameters of a genuine note. For example, genuine notes may have a range of thicknesses, a range of transmissivity and reflectivity in visible, ultraviolent (UV), and infrared (IR) spectrums, a range of magnetic disturbance created as the notes pass by a magnetic sensor, etc. In addition, data that may be used to identify a counterfeit note may include images of genuine notes. The images may include reference images of people pictured on genuine notes, images of watermarks visible as light passes through the genuine note, images of security strips that are visible when UV or IR light passes through the genuine note, etc.

User interface 210 can include any number of devices that allow a user to interface with self-service terminal 200. Non-limiting examples of user interface 210 include a keypad, a microphone, a display (touchscreen or otherwise), etc.

Communications port 212 may allow self-service terminal 200 to communicate with various information sources and devices, such as, but not limited to, remote computing devices such as self-service terminal manufacturer 104, financial institution 106, mobile devices such as a user's smart phone, peripheral devices, etc. Non-limiting examples of communications port 212 include Ethernet cards (wireless or wired), Bluetooth® transmitters and receivers, near-field communications modules, etc.

I/O interface 214 may allow self-service terminal 200 to receive and output information. Non-limiting examples of I/O interface 214 include a camera (still or video), a weight detection device such as a scale, a printer for print receipts, a scanner, etc.

Bill validator 216 may allow self-service terminal 200 to determine if a note is a genuine note or a counterfeit note. In addition, bill validator 216 may be used to collect data for each note received by self-service terminal 200. To validate notes and collect data, self-service terminal 200 may use sensors 218. Sensors 218 may include thickness sensors that may allow the note thickness to be measured. Sensors 218 may include a multichannel (e.g., a 20-channel) magnetic sensor that may be used to detect metallic features, such as threads and foils, used as security features on notes. Sensors 218 may include optical sensors that may be used to measure transmissivity and reflectivity on both sides of the note in various spectrums. For example, optical sensors may be used to view security features on the note to confirm authenticity. Visible, IR, and UV wavelength sensors may be used. Entry and Pass-way sensors may be used to detect each note entering and leaving bill validator 216.

SD card 220 may be used to store the data collected via sensors 218. SD card 220 may be sized to hold enough data such that the data stored on SD card 220 is not overwritten before notes received at self-service terminal 200 are examined by financial institution 106 to determine whether the notes are genuine notes or counterfeit notes, or whether notes identified as counterfeit were incorrectly identified as counterfeit notes.

While bill validator 216 has been described as a single unit that includes sensors 218 and SD card 220, Sensors 218 and SD card 220 may be components of bill validator 216 or self-service terminal 200 that can be replaced when defective. Sensors 218 may also be separate from bill validator 216 and mat be integrated in the transport path of the note. Thus, when a sensor is defective, only that sensor needs to be replaced instead of bill validator 216 as a whole.

Figure 3:
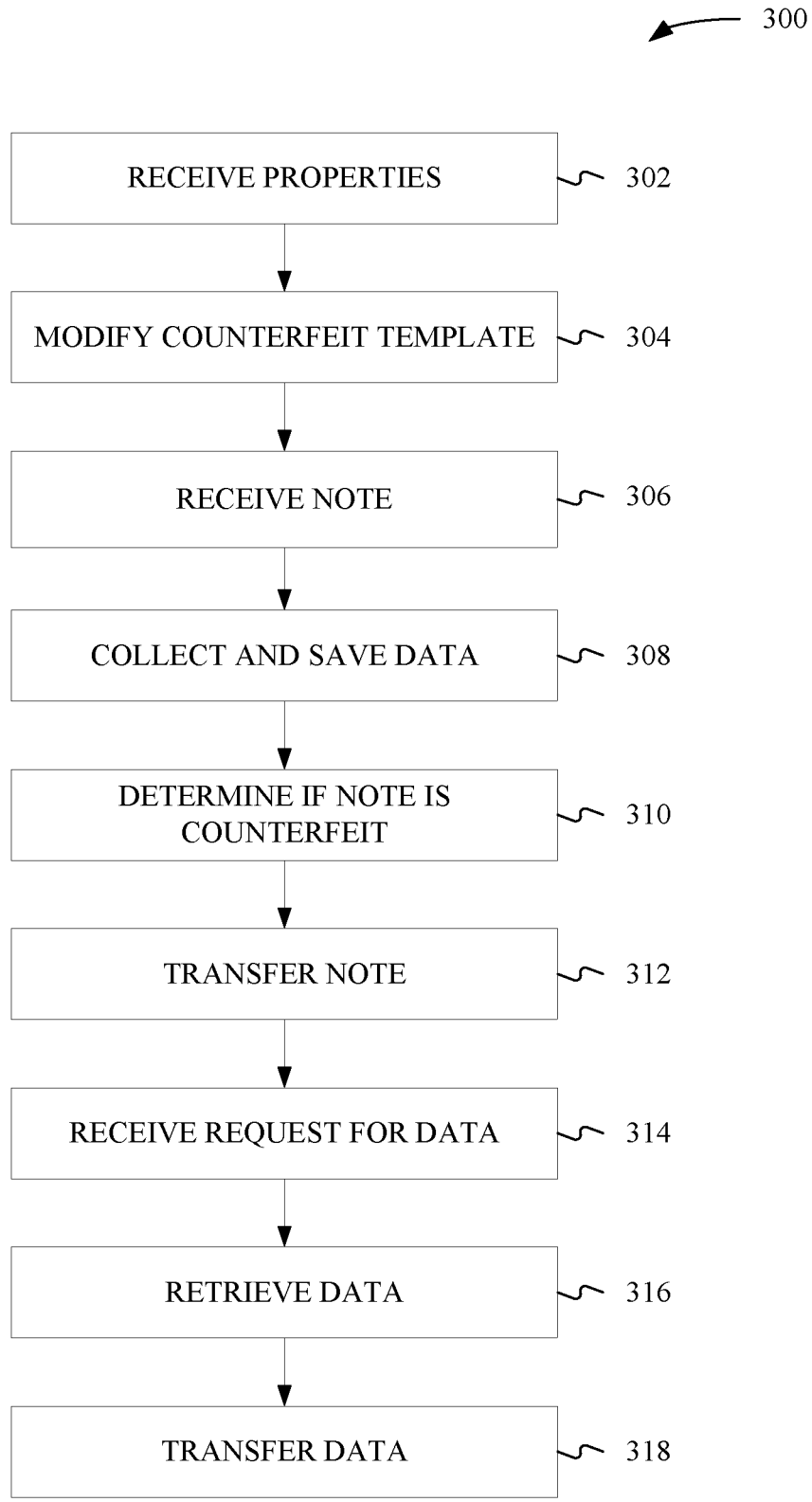
FIG. 3 shows an example method consistent with this disclosure.

FIG. 3 shows method 300 for modifying a counterfeit template and tracking a counterfeit note consistent with this disclosure. Method 300 may begin at stage 302 where properties of counterfeit notes may be received. As disclosed herein, the properties of counterfeit notes may be received from self-service terminals 102 at financial institution 106 or self-service terminal manufacturer 104.

From stage 302, method 300 may proceed to stage 304, where a counterfeit template maybe modified. As disclosed herein, a range of values for one or more of the properties of counterfeit notes maybe expanded or contracted depending on the properties of the counterfeit notes. For example, a thickness range for genuine notes may be stored in the counterfeit template as X+/−a tolerance Y. Based on the properties of the counterfeit notes, the tolerance value Y may be expanded or contracted. In addition to expanding or contracting a property, a new property may be added to the counterfeit template. For example, genuine notes may not have any metallic features, and counterfeit notes may be printed with a metallic ink. As a result, the counterfeit notes may have a measurable magnetic property that genuine notes do not have. Thus, the measurable magnetic property may be added to the counterfeit template.

From stage 304, method 300 may proceed to stage 306, where a note may be received. For example, as disclosed herein, the note may be received at self-service terminal 200. From stage 306, method 300 may proceed to stage 308, where the data for the note may be collected and saved. For instance, as disclosed herein, various properties of the note, including a serial number printed on the note, may be collected by sensors 218 and stored on SD card 220. The data collected for the note may also include transaction data. For instance, the account number, a picture captured with I/O device 214 of a user, etc., may be collected and used to identify a user that may have deposited the note. As the data is collected, it may be saved in database or other indexed fashion using the serial number or other unique feature as a reference to locate the data within the database or other data structure stored in the memory.

From stage 308, method 300 may proceed to stage 310, where a determination may be made as to whether the note is a counterfeit note or a genuine note. The determination as to whether the note is a genuine note or a counterfeit note may be made by comparing the data collected for the note against the properties stored in the counterfeit template.

From stage 310, where the note was determined to be a counterfeit note, method 300 may proceed to stage 312, where the note may be transferred to a quarantine cassette. For example, if self-service terminal 200 recycles received notes, instead of a media handler transferring the counterfeit note to a recycling cassette, where it may accidently be given to another customer, the note may be transferred to a quarantine cassette so that bank personnel may retrieve the note so that it may be turned over to the proper authorities as evidence.

From stage 312, method 300 may proceed to stage 314, where a request may be received for the data collected for the counterfeit note. For example, as disclosed herein, financial institution 106 may receive a request from self-service terminal manufacturer 104 for the data. The request may be in response to financial institution 106 notifying self-service terminal manufacturer 104 that a counterfeit note was received.

From stage 314, method 300 may proceed to stage 316, where the data associated with the counterfeit note may be retrieved. As disclosed herein, a serial number, or other unique feature, of the counterfeit note that was collected and saved may be used to locate and retrieve that data from the database or other data structure stored in the memory.

From stage 316, method 300 may proceed to stage 318, where the data associated with the counterfeit note may be transmitted. The data associated with the counterfeit note may be transmitted to self-service terminal manufacturer 104 as well as law enforcement that may investigate counterfeit currency. Transmission of the data may include retrieving the data from SD card 220 and transmitting the data via network 108. In addition, transmitting the data may include a technician retrieving SD card 220 and downloading the data, or replacing SD card 220 with a new SD card and taking SD card 220 back to service personal that maintain the counterfeit template.

The stages of method 300 have been described in a given order. However, one skilled in the art will readily understand that the various stages of method 300 may be arranged and/or omitted without departing from the scope of method 300. For example, the data collected for the counterfeit note need not be transmitted to self-service terminal manufacturer 104 before the counterfeit template is updated. For instance, self-service terminal 200 may use the data to update counterfeit template 208 without sending the data to self-service terminal manufacturer 104.

EXAMPLES

Example 1 is a method for modifying a counterfeit template, the method comprising: receiving, at a computing device comprising a processor, properties of a plurality of counterfeit notes; and modifying, by the computing device, a counterfeit template using the properties of the plurality of counterfeit notes.

In Example 2, the subject matter of Example 1 optionally includes wherein the properties of the plurality of counterfeit notes are received from a plurality of remote computing devices.

In Example 3, the subject matter of Example 2 optionally includes wherein the remote computing devices are self-service terminals.

In Example 4, the subject matter of any one or more of Examples 1-3 optionally include wherein one of the properties of the plurality of counterfeit notes is a unique feature for each of the plurality of counterfeit notes.

In Example 5, the subject matter of Example 4 optionally includes wherein the unique feature is a serial number for each of the plurality of counterfeit notes.

In Example 6, the subject matter of any one or more of Examples 1-5 optionally include wherein one of the properties of the plurality of counterfeit notes is a thickness of each of the plurality of counterfeit notes.

In Example 7, the subject matter of any one or more of Examples 1-6 optionally include wherein one of the properties of the plurality of counterfeit notes is magnetic properties of each of the plurality of counterfeit notes.

In Example 8, the subject matter of any one or more of Examples 1-7 optionally include wherein modifying the counterfeit template includes expanding a range of values for at least one of the properties included in the counterfeit template.

In Example 9, the subject matter of any one or more of Examples 1-8 optionally include wherein modifying the counterfeit template includes contracting a range of values for at least one of the properties included in the counterfeit template.

In Example 10, the subject matter of any one or more of Examples 1-9 optionally include wherein modifying the counterfeit template includes adding at least one of the properties as a new property to the counterfeit template.

Example 11 is a method for tracking a counterfeit note, the method comprising: receiving, by a self-service terminal comprising a processor, a counterfeit note; collecting, by the self-service terminal, data from the counterfeit note; and receiving a request for the date collected from the counterfeit note.

In Example 12, the subject matter of Example 11 optionally includes wherein collecting the data from the counterfeit note includes scanning the counterfeit note with an optical sensor.

In Example 13, the subject matter of Example 12 optionally includes wherein scanning the counterfeit note with the optical sensor includes measuring transmissivity and reflectivity the counterfeit note in visible, infrared, and ultraviolet spectrums.

In Example 14, the subject matter of any one or more of Examples 11-13 optionally include wherein collecting the data from the counterfeit note includes capturing a serial number for the counterfeit note.

In Example 15, the subject matter of any one or more of Examples 11-14 optionally include wherein collecting the data from the counterfeit note includes scanning the counterfeit note with an infrared scanner.

In Example 16, the subject matter of any one or more of Examples 11-15 optionally include wherein collecting the data from the counterfeit note includes saving the data to a memory of the self-service terminal.

In Example 17, the subject matter of Example 16 optionally includes wherein the memory is a secure digital (SD) card.

In Example 18, the subject matter of any one or more of Examples 16-17 optionally include wherein the SD card is a component of a bill validator of the self-service terminal.

In Example 19, the subject matter of any one or more of Examples 16-18 optionally include retrieving the data collected from the counterfeit note from the memory; and transmitting the data collected from the counterfeit note to a remote computing device.

In Example 20, the subject matter of Example 19 optionally includes wherein retrieving the data collected includes locating the data collected within the memory using a unique property of the data collected.

In Example 21, the subject matter of Example 20 optionally includes wherein the unique property is a serial number.

In Example 22, the subject matter of any one or more of Examples 11-21 optionally include wherein collecting the data from the counterfeit note includes measuring a thickness of the counterfeit note.

In Example 23, the subject matter of any one or more of Examples 11-22 optionally include wherein collecting the data from the counterfeit note includes measuring magnetic properties of the counterfeit note.

In Example 24, the subject matter of any one or more of Examples 11-23 optionally include determining that a note is the counterfeit note using a counterfeit template.

In Example 25, the subject matter of Example 24 optionally includes modifying the counterfeit template using the data collected from the counterfeit note.

In Example 26, the subject matter of Example 25 optionally includes wherein modifying the counterfeit template includes expanding a range of values of the counterfeit template based on the data collected from the counterfeit note.

In Example 27, the subject matter of any one or more of Examples 25-26 optionally include wherein modifying the counterfeit template includes contracting a range of values of the counterfeit template based on the data collected from the counterfeit note.

In Example 28, the subject matter of any one or more of Examples 25-27 optionally include wherein modifying the counterfeit template includes adding a property to the counterfeit template based on the data collected from the counterfeit note.

In Example 29, the subject matter of any one or more of Examples 11-28 optionally include transferring the counterfeit note from a bill validator to a quarantine cassette of the self-service terminal.

In Example 30, the subject matter of any one or more of Examples 11-29 optionally include receiving customer information associated with a transaction where the counterfeit note was received; and storing the customer information to a secure digital (SD) card.

In Example 31, the subject matter of any one or more of Examples 11-30 optionally include transmitting the data collected from the counterfeit note to a remote computer.

Example 32 is a self-service terminal comprising: a bill validator having a plurality of sensors; and a controller to control operation of the self-service terminal, the controller when accepting notes operable to cause the self-service terminal to perform actions comprising: receiving a counterfeit note; collecting data from the counterfeit note; and receiving a request for the date collected from the counterfeit note.

In Example 33, the subject matter of Example 32 optionally includes wherein collecting the data from the counterfeit note includes the controller operable to cause the self-service terminal to perform further actions comprising scanning the counterfeit note with an optical sensor.

In Example 34, the subject matter of Example 33 optionally includes wherein scanning the counterfeit note with the optical sensor includes the controller operable to cause the self-service terminal to perform further actions comprising measuring transmissivity and reflectivity the counterfeit note in visible, infrared, and ultraviolet spectrums.

In Example 35, the subject matter of any one or more of Examples 32-34 optionally include wherein collecting the data from the counterfeit note includes the controller operable to cause the self-service terminal to perform further actions comprising capturing a serial number for the counterfeit note.

In Example 36, the subject matter of any one or more of Examples 32-35 optionally include wherein collecting the data from the counterfeit note includes the controller operable to cause the self-service terminal to perform further actions comprising scanning the counterfeit note with an infrared scanner.

In Example 37, the subject matter of any one or more of Examples 32-36 optionally include wherein collecting the data from the counterfeit note includes the controller operable to cause the self-service terminal to perform further actions comprising saving the data to a memory of the self-service terminal.

In Example 38, the subject matter of Example 37 optionally includes wherein the memory is a secure digital (SD) card.

In Example 39, the subject matter of Example 38 optionally includes wherein the SD card is a component of the bill validator of the self-service terminal.

In Example 40, the subject matter of any one or more of Examples 37-39 optionally include wherein the actions further comprise: retrieving the data collected from the counterfeit note from the memory; and transmitting the data collected from the counterfeit note to a remote computing device.

In Example 41, the subject matter of Example 40 optionally includes wherein retrieving the data collected includes the controller operable to cause the self-service terminal to perform further actions comprising locating the data collected within the memory using a unique property of the data collected.

In Example 42, the subject matter of Example 41 optionally includes wherein the unique property is a serial number.

In Example 43, the subject matter of any one or more of Examples 32-42 optionally include wherein collecting the data from the counterfeit note includes the controller operable to cause the self-service terminal to perform further actions comprising measuring a thickness of the counterfeit note.

In Example 44, the subject matter of any one or more of Examples 32-43 optionally include wherein collecting the data from the counterfeit note includes measuring the controller operable to cause the self-service terminal to perform further actions comprising magnetic properties of the counterfeit note.

In Example 45, the subject matter of any one or more of Examples 32-44 optionally include wherein the actions further comprise determining that a note is the counterfeit note using a counterfeit template.

In Example 46, the subject matter of Example 45 optionally includes wherein the actions further comprise modifying the counterfeit template using the data collected from the counterfeit note.

In Example 47, the subject matter of Example 46 optionally includes wherein modifying the counterfeit template includes the controller operable to cause the self-service terminal to perform further actions comprising expanding a range of values of the counterfeit template based on the data collected from the counterfeit note.

In Example 48, the subject matter of any one or more of Examples 46-47 optionally include wherein modifying the counterfeit template includes the controller operable to cause the self-service terminal to perform further actions comprising contracting a range of values of the counterfeit template based on the data collected from the counterfeit note.

In Example 49, the subject matter of any one or more of Examples 46-48 optionally include wherein modifying the counterfeit template includes the controller operable to cause the self-service terminal to perform further actions comprising adding a property to the counterfeit template based on the data collected from the counterfeit note.

In Example 50, the subject matter of any one or more of Examples 32-49 optionally include wherein the actions further comprise transferring the counterfeit note from a bill validator to a quarantine cassette of the self-service terminal.

In Example 51, the subject matter of any one or more of Examples 32-50 optionally include wherein the actions further comprise: receiving customer information associated with a transaction where the counterfeit note was received; and storing the customer information to a secure digital (SD) card.

In Example 52, the subject matter of any one or more of Examples 32-51 optionally include wherein the actions further comprise transmitting the data collected from the counterfeit note to a remote computer.

Example 53 is a method for validating currency comprising: receiving at least one article of currency at a self-service terminal, the self-service terminal comprising at least one processor and at least one sensor; acquiring, by the sensor, data related to at least one of the received articles of currency; indexing the acquired data, respectively, for each of the one or more articles of currency by an identifier unique to the respective article of currency; deriving an estimate of authenticity of each uniquely identified article of currency by comparing the respectively indexed data to a counterfeit template; obtaining an independent evaluation of at least one of the estimates; and updating the template with the indexed data, based on the evaluation.

In Example 54, the subject matter of Example 53 optionally includes wherein the articles of currency are notes.

In Example 55, the subject matter of any one or more of Examples 53-54 optionally include wherein the data acquired by the sensor is one of thickness, width, length, a location of a magnetic strip, a location of a watermark, a serial number, and a color.

In Example 56, the subject matter of any one or more of Examples 54-55 optionally include wherein the unique identifier is a number printed on the note.

In Example 57, the subject matter of Example 56 optionally includes wherein the number is or purports to be a serial number.

In Example 58, the subject matter of any one or more of Examples 53-57 optionally include wherein the independent evaluation takes place outside the self-service terminal.

In Example 59, the subject matter of any one or more of Examples 53-58 optionally include wherein the independent evaluation is not performed by the self-service terminal.

In Example 60, the subject matter of any one or more of Examples 58-59 optionally include storing the indexed data to a memory by the processor; and retrieving the indexed data related to the independently evaluated estimate by reference to the unique identifier; wherein the updating the template is accomplished without physical access to the article of currency.

It will be readily understood to those skilled in the art that various other changes in the details, material, and arrangements of the parts and method stages, which have been described and illustrated in order to explain the nature of the inventive subject matter, may be made without departing from the principles and scope of the inventive subject matter as expressed in the subjoined claims.

The invention claimed is:

1. A method for modifying a counterfeit template, the method comprising:
   receiving, at a computing device comprising a processor, properties of a plurality of counterfeit notes; and
   modifying, by the computing device, the counterfeit template using the properties of the plurality of counterfeit notes;
   wherein modifying the counterfeit template includes:
      expanding a range of values for at least one of the properties included in the counterfeit template; or
      contracting a range of values for at least one of the properties included in the counterfeit template.

2. The method of claim 1, wherein a first property of the properties of the plurality of counterfeit notes is a serial number for each of the plurality of counterfeit notes.

3. The method of claim 1, wherein a first property of the properties of the plurality of counterfeit notes is a thickness of each of the plurality of counterfeit notes.

4. The method of claim 1, wherein a first property of the properties of the plurality of counterfeit notes is magnetic properties of each of the plurality of counterfeit notes.

5. The method of claim 1, wherein modifying the counterfeit template includes adding at least one first property of the properties as a new property to the counterfeit template.

6. A method for tracking a counterfeit note, the method comprising:
   receiving, by a self-service terminal comprising a processor, a counterfeit note;
   collecting, by the self-service terminal, data from the counterfeit note;
   receiving a request for the data collected from the counterfeit note;
   obtaining properties associated with known counterfeit notes that are assigned to a counterfeit template; and
   modifying the counterfeit template by expanding a range of values for at least one of the properties included in the counterfeit template based on the data collected or contracting a range of values for at least one of the properties included in the counterfeit template based on the data collected.

7. The method of claim 6, wherein collecting the data from the counterfeit note includes capturing a serial number for the counterfeit note.

8. The method of claim 6, wherein collecting the data from the counterfeit note includes saving the data to a memory of the self-service terminal.

9. The method of claim 8, wherein the memory is a secure digital (SD) card.

10. The method of claim 9, wherein the SD card is a component of a bill validator of the self-service terminal.

11. The method of claim 8, further comprising:
    retrieving the data collected from the counterfeit note from the memory; and
    transmitting the data collected from the counterfeit note to a remote computing device.

12. The method of claim 11, wherein retrieving the data collected includes locating the data collected within the memory using a unique property of the data collected.

13. The method of claim 12, wherein the unique property is a serial number.

* * * * *